United States Patent [19]

Cucheran

[11] Patent Number: 5,203,483
[45] Date of Patent: Apr. 20, 1993

[54] VEHICLE ARTICLE CARRIER

[75] Inventor: John S. Cucheran, Lake Orion, Mich.

[73] Assignee: John A. Bott, Grosse Pointe Farms, Mich.

[21] Appl. No.: 895,147

[22] Filed: Jun. 5, 1992

Related U.S. Application Data

[63] Continuation of Ser. No. 609,825, Nov. 6, 1990, abandoned.

[51] Int. Cl.$^5$ .............................................. B60R 9/00
[52] U.S. Cl. .................................... 224/321; 224/326
[58] Field of Search ............... 224/321, 325, 326, 309, 224/317, 322, 324, 320, 314

[56] References Cited

U.S. PATENT DOCUMENTS

| | | |
|---|---|---|
| Re. 26,539 | 3/1969 | Bott . |
| 3,554,416 | 1/1971 | Bott . |
| 3,623,642 | 11/1971 | Stephen . |
| 3,951,320 | 4/1976 | Bott . |
| 4,015,760 | 4/1977 | Bott . |
| 4,055,284 | 10/1977 | Bott . |
| 4,099,658 | 7/1978 | Bott . |
| 4,106,680 | 8/1978 | Bott . |
| 4,132,335 | 1/1979 | Ingram . |
| 4,156,497 | 5/1979 | Bott . |
| 4,165,827 | 8/1979 | Bott . |
| 4,170,322 | 10/1979 | Bott . |
| 4,174,794 | 11/1979 | Bott . |
| 4,182,471 | 1/1980 | Bott . |
| 4,222,508 | 9/1980 | Bott . |
| 4,239,139 | 12/1980 | Bott . |
| 4,266,708 | 5/1981 | Bott . |
| 4,274,568 | 6/1981 | Bott . |
| 4,274,570 | 6/1981 | Bott . |
| 4,277,009 | 7/1981 | Bott . |
| 4,364,500 | 12/1982 | Bott . |
| 4,396,175 | 8/1983 | Long et al. . |
| 4,406,386 | 9/1983 | Rasor et al. ................. 224/325 |
| 4,431,082 | 2/1984 | Bott . |
| 4,431,123 | 2/1984 | Bott . |
| 4,432,478 | 2/1984 | Bott . |
| 4,448,336 | 5/1984 | Bott . |
| 4,473,178 | 9/1984 | Bott . |
| 4,684,048 | 8/1987 | Bott . |
| 4,754,905 | 7/1988 | Bott . |
| 4,877,168 | 10/1989 | Bott . |
| 4,972,983 | 11/1990 | Bott . |
| 5,007,570 | 4/1991 | Himmel ........................ 224/321 |

Primary Examiner—Linda J. Sholl
Attorney, Agent, or Firm—Harness, Dickey & Pierce

[57] ABSTRACT

The present invention is an article carrier for a vehicle including a plurality of slats fixedly secured on a generally horizontal extending exterior vehicle body surface. The plurality of slats extend generally longitudinally of the vehicle. A pair of brackets are disposed upon the slats and a crossbar extends laterally between and secured adjacent its opposite ends to the pair of brackets. The slats include a channel for permitting sliding movement of at least one of the brackets along the length thereof and one or more apertures located within the channel. A locking structure on at least one of the brackets cooperates with the one or more apertures of the slats for detachably securing and allowing longitudinal adjustment of the crossbar and bracket at predetermined positions along the slats.

19 Claims, 2 Drawing Sheets

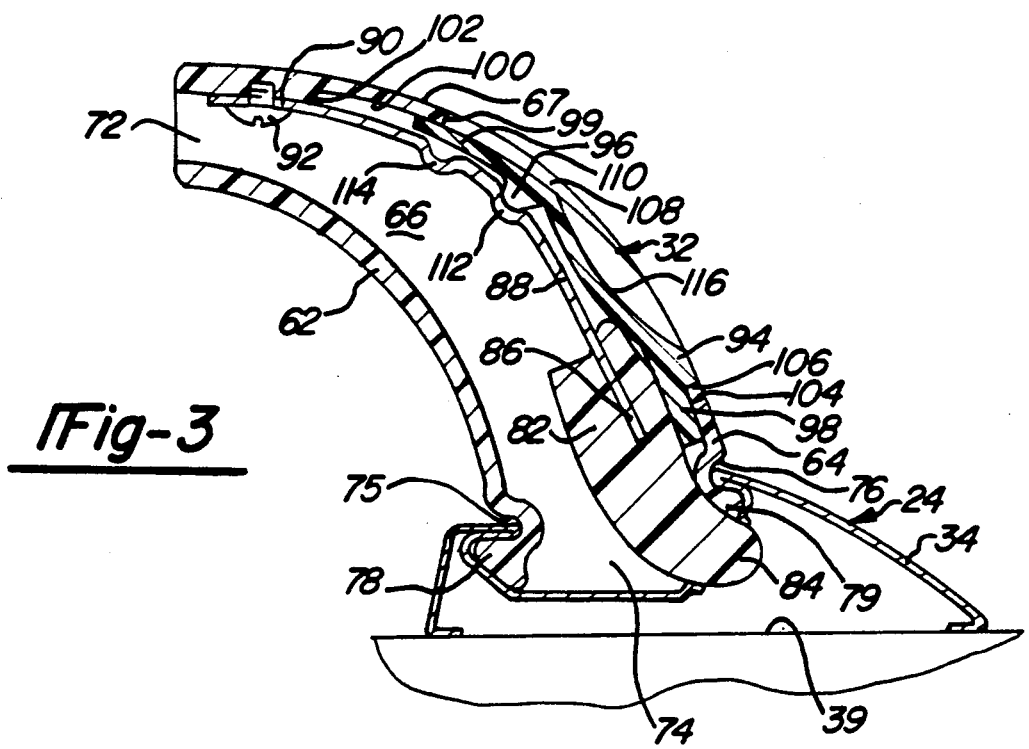
_Fig-3_
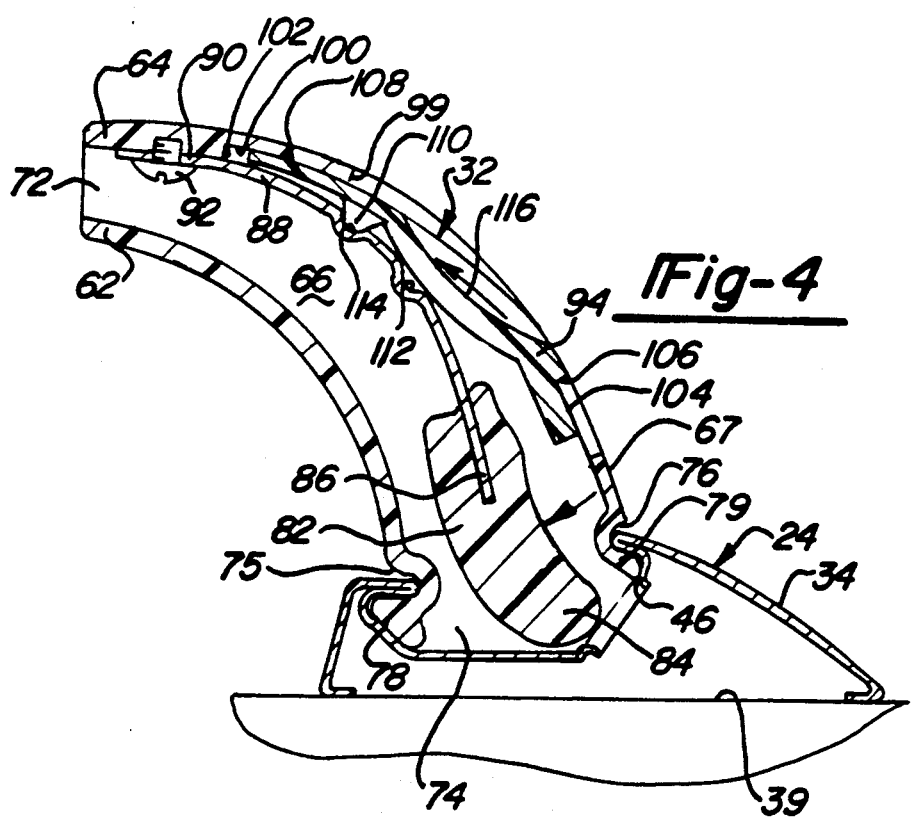
_Fig-4_

VEHICLE ARTICLE CARRIER

This is a continuation of U.S. patent application Ser. No. 07/609,825, filed Nov. 6, 1990, entitled "VEHICLE ARTICLE CARRIER" now abandoned.

BACKGROUND OF THE INVENTION

1. Field of the Invention

The present invention relates generally to an article carrier for vehicles, more particularly, to an adjustable crossbar for an article carrier on an automotive vehicle.

2. Description of the Related Art

Vehicle article carriers frequently employ two separate subassemblies or portions: a rectangular framework which surrounds the load to be carried and a plurality of slats which rest on the roof or other vehicle body portion and carries the weight of the load. In such constructions, the framework and the slats are often secured to the vehicle body independently of one another. In still another vehicle article or luggage carrier, a crossbar replaces the framework as a means for confining the articles upon the slats.

In prior U.S. Pat. No. 4,182,471, an article carrier for vehicles was disclosed having crossbars which can be adjusted on the slats and are easily removed, interchanged or adjusted in position on the slats in accordance with the needs of the user. This construction has achieved significant commercial success. Nevertheless, a need exists to provide a stanchion or bracket having a locking structure adapted to engage and disengage the slat. Therefore it is believed that a need exists for a bracket and crossbar which has an attractive appearance of modern article carriers but which possesses a greater degree of adjustability and ease of operation. It is also believed that a need exists for a locking structure which engages apertures disposed within an interior of a channel for the slat. It is further believed that a need exists for a bracket which can be secured at predetermined locations along the slat.

SUMMARY OF THE INVENTION

The present invention is an article carrier for a vehicle including a plurality of slats fixedly secured on a generally horizontal extending exterior vehicle body surface. The plurality of slats extend generally longitudinally of the vehicle. A pair of brackets are disposed upon certain of the slats and a crossbar extends laterally between and secured adjacent its opposite ends to the pair of brackets. The slats include means defining a channel for permitting sliding movement of at least one of the brackets along the length thereof and means defining one or more apertures located within the channel. A means on at least one of the brackets cooperates with the one or more apertures of the slats for detachably securing and allowing longitudinal adjustment of the crossbar and bracket at predetermined positions along the slats.

One advantage of the present invention is that a bracket and crossbar are provided which have an attractive appearance and greater degree of adjustability and ease of operation. Another advantage of the present invention is that a locking structure is provided which allows the brackets and crossbar to be adjusted at predetermined positions along the length of the slats. A further advantage of the present invention is that the locking structure engages apertures within the interior of the channel of the slats. A still further advantage of the present invention is that the locking structure includes an actuating member which is moved generally vertically relative to the slats to allow adjustment of the brackets and crossbar.

Other objects, features and advantages of the present invention will be readily appreciated as the same becomes better understood when viewed in light of the following description and accompanying drawings.

BRIEF DESCRIPTION OF THE DRAWINGS

FIG. 3 is a sectional view taken along line 3—3 of FIG. 2 illustrating a locking member in an engaged position.

FIG. 4 is a view of the structure similarly illustrated in FIG. 3 illustrating the locking member in a disengaged position.

DESCRIPTION OF THE PREFERRED EMBODIMENT(S)

Figure 1:
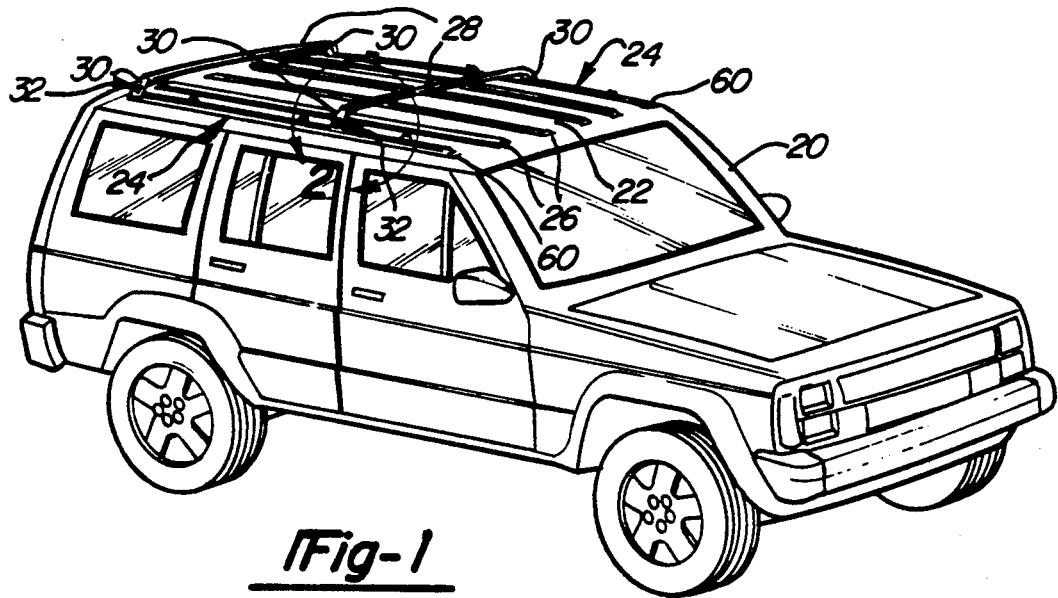
FIG. 1 is a perspective view of a vehicle illustrating an article carrier mounted thereon which is constructed in accordance with the principles of the present invention.

FIG. 1 depicts a vehicle 20 such as an automobile having a generally horizontal roof 22 on which are mounted a pair of identical, parallel, transversely spaced slat assemblies, slats or side rails, generally indicated at 24. Mounted on the roof 22 are a plurality of identical, parallel, transversely spaced support slats 26. The support slats 26 are disposed between the side rails 24 such that the support slats 26 are transversely spaced between the side rails 24. The side rails 24 and support slats 26 are secured on the roof 22 by means of sheet metal screws (not shown) as the like. Although the support slats 26 and side rails 24 are shown mounted on the roof 22, the article carrier of the present invention may be mounted with equal utility on a trunk lid or any other generally horizontal exterior body portion of the vehicle 20.

Mounted on the side rails 24 is at least one, preferably a pair of raised tubular restraining bars or crossbars 28 which are fitted at their opposite ends onto stanchions, bracket members or brackets 30. The side rails 24 are of the type disclosed in a related application, entitled "SLAT ASSEMBLY FOR VEHICLE ARTICLE CARRIERS", filed on the same day as the present application and which is assigned to the same assignee as the present application.

Figure 2:
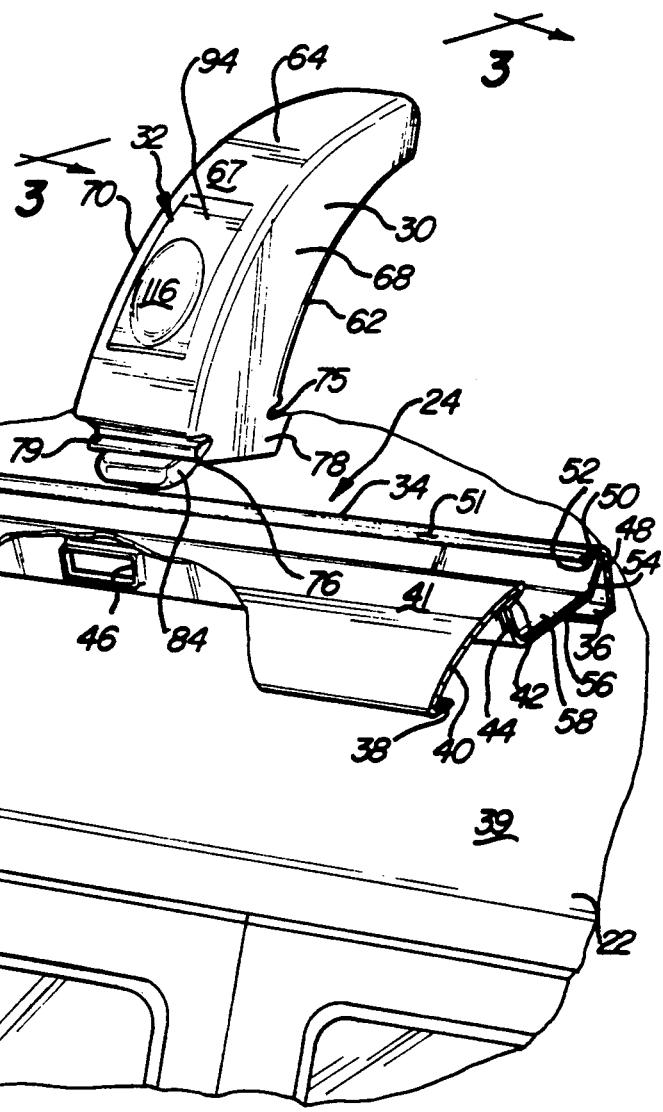
FIG. 2 is an enlarged exploded perspective view of a portion of the structure illustrated in circle 2 of FIG. 1.

Referring to FIGS. 2 and 3, the bracket 30 includes a securing and adjusting mechanism or locking structure, generally indicated at 32, for locking the crossbar 28 into position along the side rail 24. The locking structure 32 allows the crossbar 28 to be positioned operably at predetermined locations defined by a plurality of apertures 46, to be described, along the length of the side rail 24. It should be appreciated, however, that only one of the brackets 30 may include a locking structure 32 to allow one person to adjust the crossbar 28 along the side rails 24.

Referring to FIGS. 2 and 3, the side rail 24 includes a generally longitudinally extending channel member 34 having a bottom portion formed by a generally horizontal inner flange 36 and outer flange 38. The inner and outer flanges 36 and 38 are transversely spaced and adapted to rest upon a vehicle body surface 39 of the roof 22. The channel member 34 includes an outer side portion or wall 40 curving gradually upwardly and inwardly in diverging relation to the outer flange 38 and having an article supporting surface 41. The channel member 34 also includes an upper wall 42 extending back beneath the upper end of the outer wall 40 in an overlapping manner. The channel member 34 further includes a channel side wall 44 extending inwardly and downwardly from a free end of the upper wall 42. The side wall 44 includes a plurality of notches or apertures 46 defined therein and spaced along the longitudinal length thereof. The apertures 46 are generally rectangular in shape and extend transversely through the side wall 44. It should be appreciated that the apertures 46 are formed to cooperate with the locking structure 32.

The channel member 34 also includes an inner side portion or wall 48 extending upwardly and inwardly from the inner flange 36. The upper end of the inner wall 48 has a generally horizontal ledge 50 extending transversely inwardly and having an article supporting surface 51. The article supporting surface 51 is spaced generally vertically below the article supporting surface 41. The channel member 34 further includes an upper wall 52 extending back beneath the upper end of the ledge 50 in an overlapping manner. The channel member 34 includes a channel side wall 54 extending inwardly and downwardly from a free end of the upper wall 52 and a bottom wall 56 extends transversely and generally horizontally between the channel side walls 44 and 54. The bottom wall 56, channel side walls 44 and 54 define a channel 58.

The side rail 24 further includes an end cap 60 adapted to cooperate with the end of the channel member 34. The end cap 60 is adapted to close the end of the channel member 34 when assembled together. Preferably, the channel member 34 is made of a roll formed metal material. It should be appreciated that the walls of the channel member 34 are integral. It should also be appreciated that the article supporting surfaces are adapted to support either the bracket 30 or articles disposed on the slat assembly 24. It should further be appreciated that a mounting pad (not shown) may be disposed between the bottom portion of the channel member 34 and the vehicle body surface 39.

The bracket 30 has a generally arcuate shape and includes inner and outer side walls 62 and 64 which are transversely spaced to form a hollow interior chamber 66. The outer side wall 64 has an outer surface 67. The inner and outer side walls 62 and 64 are connected together by end walls 68 and 70 to form a housing about the interior chamber 66. The walls 62, 64, 68 and 70 define an opening 72 at an upper end of the interior chamber 66 and an opening 74 at lower end thereof. It should be appreciated that the opening 72 is adapted to receive one end of the crossbar 28. It should also be appreciated that the crossbar 28 is secured to the bracket 30 by suitable means.

The inner and outer side walls 62 and 64 have a longitudinally and transversely inwardly extending groove 75 and 76 at a lower end thereof. The inner and outer side walls 62 and 64 include transversely extending projections 78 and 79 at the lower end thereof which slide along the channel 58. It should be appreciated that the free ends of ledge 50 and outer side wall 40 are disposed in the grooves 76 and 76, respectively, to define foot portions which prevent relative vertical movement between the bracket 30 and channel member 34.

The locking structure 32 includes a locking member 82 having an outwardly extending finger 84 at the lower end thereof. The finger 84 extends outwardly through the opening 74. The locking member 82 is connected to or formed about a lower end 86 of a spring member 88. The spring member 88 has an upper end 90 secured by suitable means such as fastener 92 to the bracket 30. The spring member 88 may be made of a flat spring metal material and adapted to flex or move transversely the lower end 86 thereof. The spring member 88 urges the locking member 82 toward the outer side wall 64 of the bracket 30. It should be appreciated that the finger 84 cooperates with the apertures 46 of the channel member 34.

The locking structure 32 includes an actuating member 94 for actuating or moving the spring member 88 and locking member 82 such that the finger 84 is moved inwardly and outwardly to disengage and engage the aperture 46. The actuating member 94 is formed as a wall having upper and lower flange portions 96 and 98 at each end. The actuating member 94 is disposed in a generally rectangular aperture 99 and the flange portions 96 and 98 are disposed within the interior chamber 66. The upper flange portion 96 is adapted to slide along a recess 100 in the outer wall 64 and may be limited in movement upwardly by an end portion 102 of the recess 100. The lower flange portion 98 has a recess 104 which is adapted to a portion of the outer wall 64. The recess 104 has an end portion 106 which may limit the movement of the actuating member 94 relative to a lower end thereof. It should be appreciated that the actuating member 94 may have side flange portions disposed within the interior chamber 66 to prevent the actuating member 94 from exiting the aperture 99.

The actuating member 94 has an outer surface 108 which is generally arcuate and contoured to match the outer surface 67 of the bracket 30. The outer surface 108 is substantially flush with the outer surface 67 of the bracket 30 when the actuating member 94 is in the lower or closed position shown in FIG. 3.

As illustrated in FIGS. 3 and 4, the actuating member 94 includes a protrusion 110 extending inwardly into the interior chamber 66. The protrusion 110 is adapted to engage at least one, preferably a pair of spaced detents 112 and 114 in the spring member 88. The detents 112 and 114 of the spring member 88 allow the actuating member 94 to be manually moved between a lower closed or locked engaged position of FIG. 3 and an upper open or unlocked disengaged position of FIG. 4, respectively. The actuating member 94 further includes a recess 116 to allow a person to dispose their finger or thumb in to move the actuating member 94 between the engaged and disengaged positions.

As illustrated in FIGS. 3 and 4, the finger 84 of the locking member 82 engages an aperture 46 of the side rail 24 to secure the bracket 30 to the side rail 24 when the actuating member 94 is in the lower or closed position. As illustrated in FIG. 3, the protrusion 110 engages the detent 112. In operation, an operator manually pushes or slides the actuating member 94 upwardly. When this occurs, the protrusion 110 exits detent 112 and engages a portion of the spring member 88 to flex and move the spring member 88 inwardly. The finger 84 of the locking member 82 disengages the aperture 46. As illustrated in FIG. 4, when the actuating member 94 is moved upwardly to the upper or open position, the protrusion 110 then engages the detent 114 and the spring member 88 flexes outwardly to hold the finger 84 of the locking member 82 in a disengaged position with respect to the aperture 46 to allow the bracket 30 to slide along the side rail 24.

The operator then slides the bracket 30 and crossbar 28 along the side rail 24. When the crossbar 28 is at a desired location, the operator pushes or slides the actuating member 94 downward toward the roof 22 of the vehicle 20. The protrusion 110 exits the detent 114 and engages detent 112 such that the finger 84 engages the aperture 46 to lock the bracket 30 and crossbar 28 in position. The operation may be repeated.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

I claim:

1. An article carrier for a vehicle comprising:
   a plurality of slats fixedly secured on a generally horizontally extending exterior automobile body surface, said plurality of slats extending generally longitudinally of the vehicle;
   a pair of brackets disposed upon certain of said plurality of slats and a restraining bar extending laterally between and secured adjacent its opposite ends to said pair of brackets;
   said certain of said plurality of slats including means defining a channel for permitting sliding movement of at least one of said brackets along the length thereof, and means defining one or more apertures located within said channel;
   at least a single one of said pair of brackets including locking means cooperable with said one or more apertures of one of said certain of said slats and slidably movable between engaged and disengaged positions for detachably securing and allowing longitudinal adjustment of said restraining bar and said pair of brackets at predetermined positions along said certain of said slats; and
   at least a single bracket of one of said pair of brackets including a spring member coupled to said locking means;
   actuating means movable slidably relative to said bracket member and into contact with said spring member for causing said spring member to controllably move into locking means into said engaged and disengaged positions relative to said one aperture.

2. An article carrier as set forth in claim 1 including spring means for urging said locking member into said engaged position.

3. An article carrier as set forth in claim 2 wherein said securing means includes actuating means cooperable with said spring means for moving said locking member between said engaged and disengaged positions.

4. An article carrier as set forth in claim 3 wherein said spring means comprises a spring member having first and second ends.

5. An article carrier as set forth in claim 4, further including fastening means for securing said first end of said spring member to said bracket.

6. An article carrier as set forth in claim 5 wherein said locking member is secured to said second end of said spring member.

7. An article carrier as set forth in claim 6 wherein said locking member includes a finger extending outwardly.

8. An article carrier as set forth in claim 7 wherein said bracket includes means forming an interior chamber having upper and lower ends, said finger of said locking member extending through said lower end.

9. An article carrier as set forth in claim 8 wherein said actuating means comprises an actuating member having an outer surface substantially flush with an outer surface of said bracket.

10. An article carrier as set forth in claim 9 wherein said actuating means further comprises a protrusion extending inwardly from said actuating member to move said spring member and said locking member between said engaged and disengaged positions.

11. An article carrier as set forth in claim 10 wherein said spring member includes first and second detents defining said engaged and disengaged positions, said protrusion cooperating with said first and second detents.

12. An article carrier as set forth in claim 11 wherein said actuating member includes a recess in the outer surface thereof to allow an operator to place a portion of a hand therein to move said actuating member and said protrusion between said first and second detents.

13. An article carrier for a vehicle comprising:
   a plurality of slats fixedly secured on a generally horizontally extending exterior vehicle body surface, said slats extending generally longitudinally of the vehicle;
   a pair of brackets disposed upon certain of said slats and a restraining bar extending laterally between and secured adjacent its opposite ends to said bracket; and
   said certain of said of slats including means defining a channel for permitting sliding movement of at least one of said brackets along the length thereof, and means defining one or more apertures located within said channel;
   at least one of said brackets including a locking member cooperable with said one or more apertures and movable between an engaged and a disengaged position for locking and unlocking said bracket at a position along said certain of said slats; and
   spring means disposed within said at least one bracket and coupled to said locking member for moving said locking member into and out of said aperture;
   an actuating member associated with said at least one bracket and movable slidably relative to said at least one bracket for abutting said spring means and moving one end of said spring means away from said aperture, to move said locking member between said engaged and disengaged positions relative to said aperture, thereby enabling longitudinal adjustment of said restraining bar and said at least one bracket at predetermined positions along said certain of said slats.

14. An article carrier as set forth in claim 13, further including spring means for urging and maintaining said locking member in said engaged position in response to sliding movement of said actuating member.

15. An article carrier as set forth in claim 14 wherein said spring means comprises a spring member having first and second ends.

16. An article carrier as set forth in claim 15 including fastening means for securing said first end of said spring member to said bracket, said locking member being secured to said second end of said spring member.

17. An article carrier as set forth in claim 16 wherein said actuating member comprises a protrusion extending inwardly relative to said spring member to move said spring member and said locking member between said engaged and disengaged positions.

18. An article carrier as set forth in claim 17 wherein said spring member includes first and second detents defining said engaged and disengaged positions, said protrusion cooperating with said first and second detents to move said spring member between said engaged and disengaged positions.

19. An article carrier for a vehicle comprising:
a plurality of slats fixedly secured on a generally horizontally extending exterior vehicle body surface, said plurality of slats extending generally longitudinally of the vehicle;
a pair of brackets disposed upon certain of said plurality of slats and a restraining bar extending laterally between and secured adjacent its opposite ends to said pair of brackets;
said certain of said plurality of slats including means defining a channel for permitting sliding movement of at least one of said brackets along the length thereof, and means defining one or more apertures located within said channel;
at least one bracket of said pair of brackets including a locking member cooperable with said one or more apertures of said certain of said slats and movable between engaged and disengaged positions for locking and unlocking said at least one bracket at a selected one of a plurality of predetermined positions along said certain of said slats and allowing longitudinal adjustment of said restraining bar and said pair of brackets at said predetermined positions along said certain of said slats;
spring means responsive to movement of said locking member for urging said locking member into said engaged and disengaged position;
an actuating member associated with said at least one bracket slidably movable relative to said at least one bracket, and cooperable with said spring means for slidingly abuttingly moving said locking member from said engaged position into said disengaged position, and for slidingly enabling said spring means to urge said locking member from said disengaged position into said engaged position;
said spring means comprising a spring member having first and second ends;
fastening means for securing said first end of said spring member to an interior surface of said at least one bracket, said locking member being secured to said second end of said spring member;
said at least one bracket including means forming an interior chamber having upper and lower ends, said locking member including a finger extending outwardly through said lower end;
said actuating member having inner and outer surfaces, said outer surface being substantially flush with an outer surface of said bracket, and said inner surface having a protrusion extending inwardly into said interior chamber to slidably, abuttingly move said spring means and said locking member between said engaged and disengaged positions as said actuating member is moved slidably between said positions; and
said spring including first and second detents, said protrusion engaging within said first and second detents to move said second end of spring member and said locking member about said first end between said engaged and disengaged positions and to maintain said spring and said locking member in said positions.

* * * * *